United States Patent [19]

Bush et al.

[11] Patent Number: 5,198,524
[45] Date of Patent: Mar. 30, 1993

[54] MOISTURE-CURING ACRYLATE/EPOXY HYBRID ADHESIVES

[75] Inventors: Richard W. Bush, Columbia; Eugene E. Carney, Sykesville, both of Md.

[73] Assignee: W.R. Grace & Co.-Conn., New York, N.Y.

[21] Appl. No.: 689,391

[22] Filed: Apr. 22, 1991

[51] Int. Cl.$^5$ .............................................. C08G 59/00
[52] U.S. Cl. ...................................... 528/87; 528/88; 528/93; 528/110; 528/114; 528/229
[58] Field of Search ..................... 528/87, 88, 93, 110, 528/114, 229

[56] References Cited

U.S. PATENT DOCUMENTS

| | | | |
|---|---|---|---|
| 3,547,886 | 12/1970 | Gardner Jr., et al. | 260/47 |
| 3,993,708 | 11/1976 | Brinkmann et al. | 260/830 P |
| 4,096,105 | 6/1978 | McGinniss | 260/29.6 |
| 4,299,867 | 11/1981 | Emmons et al. | 427/377 |
| 4,391,958 | 7/1983 | Minato et al. | 525/504 |
| 4,486,558 | 12/1984 | Guilbert | 525/524 |
| 4,616,066 | 10/1986 | Tominaga | 525/109 |
| 4,861,832 | 8/1989 | Walsh | 525/113 |
| 5,036,269 | 11/1991 | Hung | 524/296 |
| 5,100,997 | 3/1992 | Reisch et al. | 528/61 |

FOREIGN PATENT DOCUMENTS 62-236812-A 10/1987 Japan.

*Primary Examiner*—Melvyn I. Marquis
*Assistant Examiner*—Randy Gulakowski
*Attorney, Agent, or Firm*—Valerie E. Looper

[57] ABSTRACT

An adhesive composition for adhering two substrates includes a mixture of acrylate and epoxy with a tri- or tetrafunctional ketimine as a curing agent. The adhesive composition provides a two-stage cure in which, in a first stage, the adhesive is moisture cured at ambient temperature to provide green strength. In a second stage, the adhesive is post-cured at elevated temperatures to provide a high strength bond. The ketimine is formed form the reaction of diisopropyl ketone and an amine.

10 Claims, No Drawings

MOISTURE-CURING ACRYLATE/EPOXY HYBRID ADHESIVES

BACKGROUND OF THE INVENTION

This invention relates to adhesive compositions, and more specifically to moisture-curable adhesives useful for bonding substrates such as, inter alia, metal surfaces. In particular, the invention relates to adhesive combinations of acrylate and epoxy.

A long-standing problem in the field of moisture-curable adhesives is the inability to provide adequate initial adhesion of two substrates within a short time period. This problem is particularly serious in industrial applications which do not allow sufficient time for adequate adhesion to develop. A common example is in assembly lines, where an initial bond must be developed prior to performing the next assembly operation. In automotive assembly and other industrial activities in which relatively large pieces of metal are adhesively bonded, there is the added requirement that the newly-applied adhesive bond withstand the various stresses associated with manipulation and handling of heavy metal subassemblies.

Adhesives developing high strength after prolonged or high temperature cure usually provide inadequate initial adhesion in the relatively short time periods of assembly line operations. A particular application in which good initial adhesion is critical is the bonding of metal substrates prior to post-curing of the bond at elevated temperatures. Without high initial adhesion, the bond will not hold during the heat-up to the higher temperatures of the post-cure operation.

The ability to develop adhesion is tied to the rate of cure of the polymer in the adhesive. As the molecular weight of the polymer increases due to partial curing, the polymer develops tack, i.e., a degree of adhesion. The term "green strength" is used to characterize partial cure by polymerization which occurs at ambient temperatures. An adhesive with high green strength thus has high initial adhesion or tack and desirably can maintain adhesion even upon exposure to elevated temperatures.

Acrylic is one type of adhesive useful in bonding a metal substrate either to another metal substrate or to a non-metal substrate. Acrylic-based adhesives can be made to provide a level of green strength by admixture with latent amine curatives, thereby providing rapid moisture cure at ambient temperatures. However, the strength of bonds using only ambient temperature moisture cure is insufficient for anything other than initial adhesion, being useful as a temporary or initial bond but inadequate for permanent adhesion. Subsequent post-curing of acrylic adhesives generally does not significantly add strength beyond the initial adhesion level. Thus, while acrylic adhesives may have the green strength and initial adhesion needed for assembly line operations, by themselves they are insufficient to provide a permanent bond for end product use.

Epoxy resins, on the other hand, provide very good adhesion even for metal-to-metal bonding after curing at high temperatures. However, admixture with latent amine curatives and exposure to moisture requires objectionably long times before development of any green strength. Hence unmodified epoxies are unsuitable for many applications requiring green strength.

The use of epoxy and acrylate with ketimines is known, as exemplified by U.S. Pat. No. 4,616,066. However, this patent relates to epoxy resins which are modified by vinyl or acrylic polymers, and in which no unpolymerized acrylic functions remain to participate in the subsequent curing reaction.

Epoxy blends with ketimines are disclosed in U.S. Pat. No. 4,861,832. Optional use of a multifunctional acrylate monomer is disclosed at Col. 2, line 37 to Col. 3, line 9. The acrylate monomer is combined with the epoxy resin to form a first component of a two-component epoxy resin composition, the second component being a hardener for curing the epoxy resin. The hardener is a mixture of a ketimine and an amine-terminated butadiene/acrylonitrile copolymer rubber. The use of this hardener is alleged to provide rapid cure of the epoxy. That patent does not teach that acrylate and epoxy blends can effect a two-stage cure. To the contrary, the goal of rapid epoxy cure suggests that the blends of U.S. Pat. No. 4,861,832 are cured in a single stage. Furthermore, the patent is restricted to two-component systems with limited pot life once mixed.

It is also known in the prior art to use ketimines as curing agents either alone or in combination with other amine-terminated curing agents. Ketimines function as moisture-actuated latent curing agents both for epoxy resins and for acrylate compositions. The typical commercial ketimines are difunctional.

In many applications such difunctional ketimines perform satisfactorily. When formulated with epoxy resins, however, commercial diketimines based upon methyl isobutyl ketone (MIBK) are unstable because the ketimine readily isomerizes to the enamine form, which can react with the epoxy. The mechanism of conversion to enamine is disclosed in U.S. Pat. No. 3,547,886. This patent discloses ketimines made from diisopropyl ketone (DIPK) as a solution to the problem.

Another problem with prior art ketimines is that, where a very rapid moisture cure at ambient temperatures is desired, the rate of cure using difunctional ketimines is generally inadequate.

Higher functional ketimines, i.e., those having a functionality of greater than 2, are also known. U.S. Pat. No. 3,993,708 discloses di- and trifunctional ketimines for moisture cure of epoxy. This patent does not disclose the use of acrylate/epoxy blends as adhesives. U.S. Pat. No. 4,096,105 discloses a tetrafunctional ketimine made by coupling diethylenetriamine bis(methylether ketimine) with a diepoxide. The ketimine is acidified, mixed with acrylate monomers, dispersed in water and applied as a coating. Acrylate/epoxy blends are not disclosed. U.S. Pat. No. 4,391,958 discloses triketimines used for curing urethane or epoxy systems, but acrylates are not included. The alleged advantages of using trifunctional ketimines over difunctional ketimines are improved stability of one component formulations and improved transparency of cured film.

The higher functional ketimines of these patents are not claimed to provide significant increases in rate of reaction compared to the more common diketimines. Moreover, these higher functional ketimines are susceptible to isomerization to the corresponding enamine form, thereby shortening shelf life.

The present invention solves the problem of providing adequate initial adhesion via green strength, while simultaneously providing a strong permanent adhesive bond for end product use. Furthermore, the invention solves the problem of stability associated with prior art curable adhesive compositions containing ketimines as a curing agent.

SUMMARY OF THE INVENTION

It is accordingly an object of the invention to provide a moisture-curable acrylate/epoxy hybrid adhesive.

It is another object of the invention to provide an acrylate/epoxy adhesive, as above, which develops an initial adhesion rapidly at ambient temperatures by moisture cure.

It is yet another object of the invention to provide an acrylate/epoxy adhesive, as above, which develops a strong bond after post-curing at elevated temperatures.

It is yet another object of the invention to provide an acrylate/epoxy adhesive, as above, which is storage-stable.

These objects are achieved by an adhesive composition exhibiting rapid moisture cure to provide green strength, the composition being a mixture of a polyacrylate, a polyepoxy and a triketimine or tetraketimine. The triketimine and tetraketimine are prepared from a polyamine and diisopropyl ketone. The adhesive functions as a two-stage adhesive for adhering two substrates. Initial adhesion is provided at ambient temperature, and additional adhesion occurs after curing at temperatures above ambient The objects of the invention are also achieved by an adhesive composition similar to the above, except that the acrylate and epoxy functionalities are on the same molecule rather than on separate molecules.

The objects of the invention are further achieved by a method for adhering two substrates, in which at least one of the substrates is coated with one of the above-described adhesive compositions. The two substrates are adhered together and exposed to moisture to partially cure the adhesive. This provides green strength to the assembly. The assembly is thereafter heated to temperatures above ambient to thereby result in post curing of the adhesive.

The objects of the invention are also achieved by a triketimine curing agent which is the reaction product of a tris(aminoalkyl)amine and diisopropyl ketone.

DETAILED DESCRIPTION OF THE PREFERRED EMBODIMENTS

The adhesive composition of the invention achieves rapid initial adhesion strength (i.e. green strength) under ambient conditions and can be subsequently post-cured at elevated temperatures to provide a strong bond suitable for end use applications. Further, the adhesive composition of the invention provides increased storage stability.

The invention is suitable for bonding a wide variety of materials including metals, plastics, wood, and the like, and is particularly suited to bonding metal-to-metal. In many applications the initial adhesion achieved is at least about 1 psi.

The adhesive composition contains both acrylate and epoxy functionalities plus a ketimine which hydrolyzes to form an amine curing agent upon exposure to moisture. The acrylate and epoxy functionalities can be on separate molecules or on the same molecule. When the acrylate and epoxy functionalities are on separate molecules, the adhesive composition is a blend of an acrylate monomer or oligomer and an epoxy resin or resins.

Acrylates useful in forming the adhesive composition include polyacrylates formed from the various acrylate monomers. Exemplary such monomers include ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol tetraacrylate, pentaerythritol triacrylate, and mixtures thereof.

Acrylate-terminated prepolymers are especially useful and can be prepared in several ways. One way is to esterify or transesterify a hydroxy-terminated prepolymer with acrylic acid or a low molecular weight acrylate ester. Another way is to react a hydroxy-terminated prepolymer with the reaction product of equimolar amounts of a hydroxyacrylate and toluene diisocyanate. Yet another way that the acrylate component can be provided is by reacting a hydroxyacrylate with an isocyanate-functional urethane prepolymer. Generally, such isocyanate-functional urethanes are prepared by reacting a polyol, polyether, hydroxyl-terminated polyester, polyester amide, polyamine, or other polyfunctional active hydrogen-containing compound with a diisocyanate or other polyisocyanate having up to eight functional isocyanate groups.

Preferred reactants include polyhydroxy polyesters, polyhydroxy polyethers and polyisocyanates having two or three reactive isocyanate groups. An extensive description of some of the useful techniques for preparing isocyanate-functional urethanes can be found in Saunders and Frisch "Polyurethanes, Chemistry and Technology", Part II, Interscience (New York 1964), especially at pages 8 to 49, and in the references cited therein. Other preparative techniques which are known in the art can also be employed. Generally, any isocyanate-functional urethane known in the art can be employed in the practice of this invention, with such urethanes having a molecular weight of at least 500, particularly in the range of 1,000 to 10,000 being preferred.

Any of the polyisocyanates having at least two reactive isocyanate groups can be employed in forming isocyanate-functional urethanes suitable for use in the practice of the invention. Such polyisocyanates include, without limitation, aliphatic polyisocyanates such as 1,6-hexamethylene diisocyanate, 1,8-octamethylene diisocyanate, 1,12-dodecamethylene diisocyanate; 2,2,4-trimethylhexamethylene diisocyanate; and the like; 3,3'-diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N',N"-tris-(6-isocyanatohexamethylene) biuret and related polyisocyanates; as well as other known polyisocyanates derived from aliphatic polyamines; aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate, and the like.

Preferred isocyanate-functional urethanes are alkylene and phenylene diisocyanate polyether prepolymers in the 500-3,000 molecular weight range. The polyurethane prepolymers are reacted with a hydroxyacrylate monomer to form a urethane acrylate.

A particularly preferred group of urethane modified acrylates are polyether urethane triacrylates, a specific example of which is ANCAREZ 300A, a product of Pacific Anchor Chemical Corporation.

The epoxy resin component of the adhesive is comprised of one or more curable resins containing more than one 1,2-epoxy group per molecule. Thus, the epoxy compounds which are suitable for use in the practice of the invention can be any monomeric or polymeric compound or mixtures of compounds having an epoxy equivalent greater than one, that is, wherein the average number of epoxy groups per molecule is greater than one, with epoxides having two epoxy groups being preferred.

Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol, 2,2-bis(4-hydroxy cyclohexyl) propane and polyalkylene glycols such as polypropylene glycol; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols such as bisphenol A, 1,1-bis(4-hydroxyphenyl)ethane, 1,1-bis(4-hydroxyphenyl)isobutane, 1,5-dihydroxynaphthalene, and novolak resins; also dimerized linoleic acid extended bisphenol A diglycidyl ether. Generally, the preferred epoxy compounds are resins having an epoxide equivalent weight of about 100 to 2000. If desired, an epoxy resin prepolymer can be provided by reaction of hydroxyl-containing epoxy resins with an isocyanate-functional urethane in the same manner as described above for the acrylate component of the adhesive.

The mole ratio of acrylate to epoxy in the adhesive composition is determined in part by the desired level of green strength and the level of final (end use) bonding strength needed. Increasing the level of acrylate increases the green strength but may result in decreased end use bonding strength. Other factors in determining the mole ratio are the time and temperature constraints of moisture-cure and post-cure.

In general, the amount of acrylate in the adhesive composition should be at least about 10 mole % and can be as high as 90 mole % of the sum of acrylate and epoxy. For most applications, the acrylate constitutes between about 30 and 70 mole %.

The acrylate and epoxy can be mixed as separate components or, in a preferred embodiment, the epoxy and acrylate functions are on the same molecule. In the latter case, one or more epoxy resins are reacted with a chain extender having amine functionality and the intermediate is reacted with an acrylated isocyanate to form a multifunctional oligomer having at least one acrylate and at least one epoxy functional group. Preferably, the average functionality of each group is at least 2 and can be as high as 5 or more, depending on the structure of the chain extender. In general, the molecular weight of the multifunctional oligomer is at least about 500 with between about 1,000 and 10,000 being preferred.

A highly preferred oligomer composition is made by reacting meta-phenylenediamine (MPDA) with a mixture of three epoxy resins, a polyoxypropylene diglycidyl ether (available from Dow Chemical Company as DER 732), the diglycidylether of bisphenol A (available from Shell as EPON 828), and the dimer acid extended diglycidyl ether of bisphenol A (available from Shell as EPON 872). This intermediate is then reacted with the reaction product of equimolar parts of toluene diisocyanate and hydroxypropyl acrylate (TDI-HPA). A preferred molar ratio of the reactants is 1/2/2/2/3.4 MPDA/DER 732/EPON 828/EPON 872/TDI-HPA.

The ketimine curing agents of the invention have a functionality of 3 or 4. The use of these specific higher functional ketimines results in a cure that proceeds more rapidly compared to formulations with diketimines.

In particular, the triketimines of the invention are the reaction product of a tris(aminoalkyl)amine with diisopropyl ketone (DIPK) in a 1:3 (stoichiometric) molar ratio. In general, the tris(aminoalkyl)amine contains between 3 and 15 carbon atoms.

In a preferred embodiment, the tris(aminoalkyl)amine is tris(aminoethyl)amine (TREN). The reaction product using TREN is designated TREN(DIPK)$_3$.

The tetraketimines of the invention are formed in a two-step reaction, the first step being the reaction of a dialkylenetriamine with DIPK in a 1:2 (stoichiometric) molar ratio. Two of the molecules formed in this first step are then coupled by reaction of the secondary NH groups with a diacrylate, a diepoxide or a diisocyanate to form the tetraketimine. In general, the dialkylenetriamine contains between 2 and 10 carbon atoms.

In a preferred embodiment, the dialkylenetriamine is diethylenetriamine. The reaction product of the first step is accordingly:

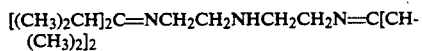

To further increase the rate of cure, the acrylate/epoxy adhesive composition can include an organotin catalyst. It has been discovered that the addition of a small amount of an organotin compound accelerates the hydrolysis of the ketimine and speeds the overall moisture cure of the acrylate/epoxy resin to only a few hours.

Organotin compounds useful in the invention include the various stannous alkanoates exemplified by stannous octoate. In general, the organic stannous salts are salts of carboxylic acids having from 2 to 20 carbon atoms, preferably from 6 to 10 carbon atoms, with stannous octoate being highly preferred. In another preferred embodiment, the tin catalyst is an amine modified compound such as the reaction product of a stannous alkanoate and a mono- or polyfunctional amine. Such compounds are described in detail in copending and concurrently filed U.S. patent application Ser. No. 689,385, which is hereby incorporated by reference. The polyamines optionally include ether groups. A specific example is the reaction product of stannous octoate and ethylenediamine.

Illustrative of suitable polyamines useful for modifying the tin catalyst are ethylenediamine, triethylenetetramine, diethylenetriamine, epoxy adducts of triethylene tetramine, epoxy adducts of ethylenediamine, epoxy adducts of diethylenetriamine, 1,3-diaminopropane, 1,4-diaminobutane, 1,6-diaminohexane, 4,9-dioxadodecane-1,12-diamine, 4,4'-diaminodicyclohexylmethane and 9-aminomethylstearylamine. Higher functional amines which can also be reacted with stannous alkanoates include tris(aminoethyl)amine (TREN).

The ratio of stannous alkanoate to polyamine in the reaction can vary. In general, the ratio of moles of stannous alkanoate to equivalents of amino groups can vary from about 1:8 to about 8:1. In a preferred embodiment, the tin/amine catalyst also contains a small amount of reacted water.

The amount of tin catalyst used can vary from about 0.1% to about 5% by weight, desirably from about 0.5% to about 4% and preferably from about 2% to about 3% by weight of the total weight of epoxy, acrylate and ketimine.

The adhesive compositions of the invention can also contain conventional additives normally found in epoxy and acrylate adhesives, including fillers and pigments such as talc, calcium carbonate, calcium silicate, metal powders, and titanium dioxide; viscosity modifiers such as silica and clays; lubricants and plasticizers such as silicones, petroleum oils, glycerine, aromatic phthalates and the like; antioxidants and stabilizers; and low molecular weight mono- and difunctional epoxy diluents such as butyl glycidyl ether, 1,4-butanediol diglycidyl ether and other alkyl glycidyl ethers of 8 to 16 carbon atoms. Such additives are incorporated in ratios well known to practitioners in the art of epoxy and acrylate adhesives.

The invention is illustrated by, but not limited to, the following examples. All percentages in the examples, and elsewhere in the specification, are by weight unless otherwise specified. The stannous octoate used was obtained from Air Products under the "T-9" trademark. The acronym EDA refers to ethylenediamine.

In the examples, an inclined groove device was used to measure the degree of cure. This device consists of a Teflon block machined to contain four grooves each 10 cm long, 1 cm wide, and varying uniformly in depth from 0 to 10 mm. The moisture-curable adhesive is flowed into the groove, levelled, and the device place in a cabinet of desired humidity for the desired time. The device is removed and the cured adhesive is peeled from the thin end until uncured adhesive is observed. The horizontal distance is divided by 10 to obtain the depth of cure.

EXAMPLE 1

Synthesis of TREN(DIPK)$_3$

A mixture of 146 g (1 mole) of tris(aminoethyl)amine (TREN) plus 570 g (5 moles) of diisopropyl ketone (DIPK) plus 30 g of Amberlyst 15 (acidic ion exchange resin sold by Dow Chemical Company) was heated at reflux (117°-137° C.) for 14 hours with removal of water via a Dean-Stark trap. The mixture was filtered to remove the Amberlyst, and the excess DIPK was vacuum-stripped. The product in 82% yield was analyzed by NMR and found to contain 85% of the desired TREN(DIPK)$_3$ ketimine, 8% DIPK and 7% TREN.

EXAMPLE 2

Synthesis of Tetraketimines

Tetraketimines were prepared by first reacting diethylenetriamine (DETA) with DIPK in a 1:2 molar ratio by the procedure of Example 1 to form

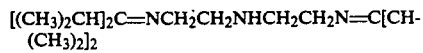

Then two of these molecules were coupled by reaction of the secondary NH groups with a diacrylate, a diepoxide or a diisocyanate to form in each case a tetraketimine.

EXAMPLE 3

Synthesis of Stannous Octoate/Ethylenediamine Catalyst

Stannous octoate (1.684 g or 4.16 mmoles) was mixed with ethylene diamine (0.125 g or 2.08 mmoles) to give a viscous yellow-orange mixture providing a 2/1 mole ratio of stannous octoate/EDA. In a similar manner, catalysts were prepared having other ratios of stannous octoate to EDA.

EXAMPLE 4

Curing of an Acrylate System with TREN(DIPK)$_3$ 75 parts of a polyether urethane triacrylate of equivalent weight 1660 (ANCAREZ 300A from Pacific Anchor Corporation) was formulated with 8 parts pentaerythritol tetraacrylate (PETA), 15 parts calcium carbonate, 8 parts TREN(DIPK)3 and 2 parts stannous octoate/EDA (8/1 mole ratio) and placed in an inclined groove device varying in depth from 0–10 mm. After 4.5 hours at 100% RH, the cure had penetrated 1.9 mm, and after 9 hours, 2.9 mm. By contrast, a similar formulation containing the diketimine hexanediamine bis(diisopropyl ketimine) in 8 hours at 100% RH cured only 1.9 mm and in 12 hours only 2.7 mm.

EXAMPLE 5

Curing of a Mixed Acrylate/Epoxy System with TREN(DIPK)$_3$

A polyether urethane triacrylate of equivalent weight 1660 (ANCAREZ 300A) in the amount of 6.10 g was formulated with 0.06 g of pentaerythritol tetraacrylate (PETA), 1.38 g of an epoxy resin prepared by reacting 7 parts of a polyoxypropylene triamine (JEFFAMINE 403, available from Texaco Co.) with 50 parts of the diglycidyl ether of bisphenol A (EPON 828), 0.92 g of TREN(DIPK)$_3$, 0.32 g of 33% dicyandiamide (DICY) in EPON 828, 1.22 g of stearate-coated calcium carbonate, and 0.20 g of a tin catalyst made by reacting 1 mole of stannous octoate with mole of ethylenediamine. Similar formulations were made with equivalent amounts of two diketimines, HDA(DIPK)2 and MPMD(DIPK)$_2$ (MPMD is 2-methylpentamethylenediamine), and all three formulations placed in the inclined groove device at 100% RH. Cure depths vs time were as follows:

|  | TREN(DIPK)$_3$ | HDA(DIPK)$_2$ (Comparative) | MPMD(DIPK)$_2$ (Comparative) |
| --- | --- | --- | --- |
| 2 hrs | 0.8 mm | 0.0 mm | 0.0 mm |
| 4 hrs | 1.3 | 0.6 | 0.0 |
| 6 hrs | 2.0 | 1.4 | 0.8 |
| 10 hrs | 2.5 | 1.8 | 2.0 |
| 19 hrs | 4.1 | 3.4 | 3.3 |
| 27 hrs | 5.0 | 4.1 | 4.0 |

Formulations of the TREN(DIPK)3 and HDA(DIPK)2 were also applied as a 1×1×0.020-inch bond line between the edges of cleaned 4×1×0.032-inch cold rolled steel strips configured as a lap specimen. The bonds were exposed to 100% RH for 6 hours, then a 500 g weight was suspended from one end and the specimen hung in an 180° C. oven for 30 minutes. The bonds of the TREN(DIPK)3 survived this test, indicating that they had moisture-cured to provide green strength of more than 1 psi for holding during the heat cycle of the subsequent elevated temperature final cure. Subsequently, the bonds were pulled at 23° C. on an Instron tester and exhibited a strength of 56 psi. By contrast, the bonds of the HDA(DIPK)$_2$ formulation failed to hold for more than 1 minute in the 180° C./500 g test.

EXAMPLE 6

Acrylate and Epoxy Functions on Same Molecule Cured with TREN(DIPK)$_3$

A mixture of 2-methylpentamethylenediamine (MPMD), DER 732 epoxy resin, EPON 828, and EPON 872, in the mole ratio 1.00:2.75:2.00:1.25, was heated with stirring at 70° C., and 0.05% by weight of T-9 catalyst (defined as stannous octoate) was added. After 1 hour no N-H was observable by IR. A 1/1 molar ratio adduct of toluene diisocyanate and hydroxypropyl acrylate (TDI-HPA) was then added in the amount of 2.50 moles per 1.00 mole of initial MPMD, along with 0.05% by weight of T-9 catalyst. After 1 hour at 70° C., no NCO was observable by IR. Based upon the above stoichiometry, a typical product molecule should have 4 epoxy groups and 2 or 3 acrylate groups, and for each product molecule there should be two unreacted molecules of epoxy resin.

A formulation was made of 7.01 g of the above acrylate/epoxy hybrid, 1.33 g of TREN(DIPK)$_3$ ketimine, 0.44 g of 33% dicyandiamide (DICY) in EPON 828, 1.22 g of stearate-coated calcium carbonate, and 0.2 g of stannous octoate/ethylenediamine (8/1 mole ratio) catalyst. The formulation was applied as a lap bond as in Example 5 and exposed to 100% RH for 6 hours. The specimens passed the 500 g/18° C./30 minute test, and were subsequently pulled on the Instron tester to give a strength of 435 psi.

EXAMPLE 6a

Other Amines and Ratios of Epoxy

Using the same procedure as in Example 6, various additional oligomers were synthesized in which (a) the DER 732 ratio was varied from 2.65 to 3.25, EPON 828 was varied from 2.20 to 3.50, EPON 872 was varied from 0.88 to 1.47, and total epoxy varied from 6.0 to 7.7; (b) the diamine was 2-MPMD or polyoxyethylene diamine (Jeffamine EDR 148 from Texaco); and (c) the TDI-HPA adduct varied from 2.0 to 3.5.

EXAMPLE 7

Use of Tetraketimine Based on DETA(DIPK)$_2$ Coupled With Butanediol Diacrylate

The diketimine DETA(DIPK)$_2$ was prepared by reaction of DETA plus DIPK in the manner of Example 2. To 14.98 g (0.051 mole) DETA(DIPK)$_2$ was added 4.82 g (0.024 mole) of 1,4-butanediol diacrylate (BDDA). When IR showed substantial remaining NH, an additional 7.23 g (0.036 mole) of BDDA was added and heated at 55°-60° C. overnight. The recipe of Example 5 was then formulated with the above product as ketimine, and compared with formulations made with TREN(DIPK)$_3$ and HDA(DIPK)$_2$. All three were exposed at 100% RH in the inclined groove device, with resulting cure depths vs time as shown below:

| | BDDA/DETA(DIPK)$_2$ | TREN(DIPK)$_3$ | HDA(DIPK)$_2$ (Comparative) |
|---|---|---|---|
| 2 hrs | 0.6 mm | 0.8 mm | 0.0 mm |
| 4 hrs | 1.0 | 1.3 | 0.5 |
| 6 hrs | 1.8 | 1.9 | 1.2 |

EXAMPLE 8

Synthesis of Acrylate/Epoxy Oligomer Based on meta-Phenylenediamine as Chain Extender To a mixture of 406.55 g (0.635 mole) of DER-732, 241.39 g (0.635 mole) of EPON 828 and 889.32 g (0.635 mole) of EPON 872 was added 34.35 g (0.38 mole) of meta-phenylenediamine, and mixed 3 hrs. at 85° C., after which infrared analysis showed no remaining NH. As stabilizer, 1.4 g of the monomethyl ether of hydroquinone was added. Then 328.40 g (1.080 moles) of the reaction product of equimolar quantities of toluene diisocyanate and hydroxypropyl acrylate (TDI-HPA) was added gradually over 80 minutes. Stannous octoate (0.15 g) was added and mixed for 1 hr., after which IR showed no remaining NCO.

EXAMPLE 9

Storage-Stability of Formulations Containing TREN(DIPK)$_3$

A formulation was prepared under dry conditions by mixing 6.94 g of the acrylate/epoxy oligomer of Example 8, 0.89 g of 33% DICY in EPON 828, 0.95 g of TREN(DIPK)$_3$, 1.22 g of stearate coated CaCO$_3$ (Winnofil SPT from ICI), and 0.2 g stannous octoate. A similar formulation was made using a ketimine prepared from TREN plus di-n-propylketone, TREN(DNPK)$_3$. The formulations were placed in the inclined groove and placed in a dry desiccator for 7 days. The samples were removed and the top and bottom of the 10 mm-thick section was measured for hardness by a Texture Analyzer penetrometer using a needle probe for a depth of 2 mm at a penetration rate of 0.2 mm/sec. The penetration force in grams was as follows:

| | Bottom | Top |
|---|---|---|
| TREN(DIPK)$_3$ | 160 | 289 |
| TREN(DNPK)$_3$ (Comparative) | 462 | 577 |

The lower force required to penetrate the TREN(DIPK)$_3$ formulation indicated a lower degree of cure and thus a better stability.

EXAMPLE 10

High Cure Strength With TREN(DIPK)$_3$

Formulations were prepared by mixing 6.94 g of the acrylate/epoxy oligomer of Example 8, 0.89 g of 33% DICY in EPON 828, 1.22 g of Winnofil SPT stearate-coated CaCO$_3$, 0.2 g of ethylenediamine/stannous octoate adduct ($\frac{1}{8}$ mole ratio) and either 0.95 g of TREN(DIPK)$_3$ or 1.79 g of BAPP(DIPK)$_2$, the ketimine of bisaminopropylpiperazine and diisopropyl ketone. (The amounts of each ketimine are equivalent in available NH$_2$). The formulations were applied as 1×1×0.020 inch bonds on clean 4×1×0.032 inch cold rolled steel and exposed to 100% RH for 8 hours. After curing under 500 g load at 180° C./30 min the bonds were tested for shear strength as follows:

|  | PSI |
|---|---|
| TREN(DIPK)₃ | 1765 |
| BAPP(DIPK)₂ | 690 |

Thus, the strength is higher with the trifunctional TREN(DIPK)$_3$, even though both ketimines contain tertiary amine group as potential catalysts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adhesive composition exhibiting rapid moisture cure to provide green strength, comprising a mixture of:
   a polyacrylate selected from the group consisting of a polyether urethane triacrylate, ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol tetraacrylate, pentaerythritol triacrylate, and mixtures thereof;
   a polyepoxy resin formed from an epoxy compound selected from the group consisting of monomeric and polymeric compounds and mixtures of compounds having an epoxy equivalent greater than one; and
   a ketimine prepared from a polyamine and diisopropyl ketone, the ketimine selected from the group consisting of a triketimine prepared by the reaction of a tris(aminoalkyl)amine having from 3 to 15 carbon atoms and diisopropyl ketone in a 1:3 molar ratio, a tetraketimine and mixtures thereof;
wherein the adhesive functions as a two-stage adhesive for adhering two substrates, providing an initial adhesive strength at ambient temperature and additional adhesive strength after curing at temperatures above ambient.

2. An adhesive composition according to claim 1, wherein the ketimine is a triketimine prepared by the reaction of a tris(aminoalkyl)amine having from 3 to 15 carbon atoms and diisopropyl ketone in a 1:3 molar ratio.

3. An adhesive composition according to claim 1, wherein the polyacrylate is a polyether urethane triacrylate, the polyepoxy is the reaction product of a polyoxypropylene triamine and the diglycidyl ether of bisphenol A, and the triketimine is the reaction product of tris(aminoethyl)amine and diisopropyl ketone.

4. An adhesive composition according to claim 1, wherein the ketimine is a tetraketimine prepared by (a) reacting a dialkylenetriamine having from 2 to 10 carbon atoms and diisopropyl ketone in a 1:2 molar ratio to form a compound having one secondary NH group and (b) coupling two molecules of the compound formed in (a) by reaction with a diacrylate, a diepoxide or a diisocyanate to thereby form the tetraketimine.

5. An adhesive composition according to claim 4, wherein the dialkylenetriamine is diethylenetriamine.

6. An adhesive composition according to claim 1, further including a catalytically effective amount of an organotin catalyst.

7. An adhesive composition according to claim 6, wherein the organotin catalyst comprises a stannous salt of a carboxylic acid having from 2 to 20 carbon atoms.

8. An adhesive composition according to claim 7, wherein the organotin catalyst comprises tin octoate.

9. An adhesive composition according to claim 6, wherein the organotin catalyst is the reaction product of a stannous salt of a carboxylic acid having from 2 to 20 carbon atoms and a mono- or polyfunctional amine.

10. An adhesive composition according to claim 9, wherein the organotin catalyst is the reaction product of stannous octoate and ethylenediamine.

* * * * *